United States Patent
Gokturk et al.

(10) Patent No.: US 7,346,209 B2
(45) Date of Patent: Mar. 18, 2008

(54) THREE-DIMENSIONAL PATTERN RECOGNITION METHOD TO DETECT SHAPES IN MEDICAL IMAGES

(75) Inventors: Salih B. Gokturk, Mountain View, CA (US); Carlo Tomasi, Palo Alto, CA (US); Acar Burak, Bebek (TR); Christopher F. Beaulieu, Los Atos, CA (US); Sandy A. Napel, Menlo Park, CA (US); David S. Paik, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 804 days.

(21) Appl. No.: 10/676,839

(22) Filed: Sep. 30, 2003

(65) Prior Publication Data

US 2004/0165767 A1 Aug. 26, 2004

Related U.S. Application Data

(60) Provisional application No. 60/415,269, filed on Sep. 30, 2002.

(51) Int. Cl.
*G06K 9/62* (2006.01)
(52) U.S. Cl. .................................... 382/159
(58) Field of Classification Search ............... 382/159
See application file for complete search history.

(56) References Cited

U.S. PATENT DOCUMENTS

| | | | |
|---|---|---|---|
| 5,458,111 A | 10/1995 | Coin | |
| 5,491,627 A | 2/1996 | Zhang et al. | |
| 5,891,030 A * | 4/1999 | Johnson et al. | 600/407 |
| 5,920,319 A | 7/1999 | Vining et al. | |
| 5,971,767 A | 10/1999 | Kaufman et al. | |
| 6,083,162 A | 7/2000 | Vining | |
| 6,246,784 B1 | 6/2001 | Summer et al. | |
| 6,249,594 B1 * | 6/2001 | Hibbard | 382/128 |
| 6,331,116 B1 | 12/2001 | Kaufman et al. | |
| 6,345,112 B1 | 2/2002 | Summers et al. | |
| 6,556,696 B1 | 4/2003 | Summer et al. | |
| 2002/0039400 A1 | 4/2002 | Kaufman et al. | |

(Continued)

OTHER PUBLICATIONS

Thoeni R.F., Laufer I. "Polyps and cancer," Textbook of Gatrointestinal Radiology, Philadelphia: W.B. Saunders, 1994; 1160.

(Continued)

*Primary Examiner*—Brian Werner
*Assistant Examiner*—Jonathan Schaffer
(74) *Attorney, Agent, or Firm*—Lumen Patent Firm, Inc.

(57) ABSTRACT

A detection and classification method of a shape in a medical image is provided. It is based on generating a plurality of 2-D sections through a 3-D volume in the medical image. In general, there are two steps. The first step is feature estimation to generate shape signatures for candidate volumes containing candidate shapes. The feature estimation method computes descriptors of objects or of their images. The second general step involves classification of these shape signatures for diagnosis. A classifier contains, builds and/or trains a database of descriptors for previously seen shapes, and then maps descriptors of novel images to categories corresponding to previously seen shapes or classes of shapes.

12 Claims, 10 Drawing Sheets

U.S. PATENT DOCUMENTS

2003/0161522 A1  8/2003  Campanini et al.
2003/0172043 A1  9/2003  Guyon et al.

OTHER PUBLICATIONS

Winawer S.J., Zauber A.G., Ho M.N., O'Brien M.J., Gottlieb L.S., Sternberg S.S., Waye J.D., et al. "Prevention of colorectal cancer by colonoscopic polypectomy," The national polyp study workgroup, N. Engl. J. Med. 1993; 329: 1977-1981.

Jerebko et al. "Computer-aided polyp detection in CT colonography using an ensemble of support vector machines" International Congress Series 1256 (2003) pp. 1019-1024.

K. Veropoulos et al. (1999) in a paper entitled "Controlling the sensitivity of support vector machines" and presented at the Int. Joint Conf. AI (IJCAI'99), Stockholm, Sweden.

DM Eddy (1990) entitled "Screening for colorectal cancer" and published in Ann. Intern Med., 113 373-384.

RM Summers et al. (2000) entitled Polypoid lesions of airways: early experience with computer-assisted detection by using virtual bronchoscopy and surface curvature and published in Radiology 208 (2):331-337.

Yoshida et al., (2000) in a paper entitled "Detection of colonic polyps in CT colonography based on geometric features" and published in Radiology 217 (SS):582-582.

SB Gokturk & C Tomasi (2000) in a paper entitled "A graph method for the conservative detection of polyps in the colon" and published at the 2nd International Symposium on Virtual Colonoscopy Nov. 2000 Boston, USA.

DS Paik et al. (2000) in a paper entitled Computer aided of polyps in CT colonography: Free response roc evaluation of performance and published in Radiology 217 (SS)370.

DS Paik et al. (1999) in a paper entitled "Detection of polyps in CT colonography: A comparison of a computer aided detection algorithm to 3-D visualization methods" and published n Radiology Society of North America 85th Scientific Sessions. Chicago, IL: Radiology Soc. N. Amer. p. 428.

MK Hu (1962) entitled "Visual pattern recognition by moment invariants" and published in IRE transactions on information theory IT-8:179-187.

B Scholkopf (1997) in a book entitled "Support Vector Learning" and published by Munich, Germany; R. Oldenbourg Verlag.

D.S. Paik, et al. 1998, "Automated flight path planning for virtual endoscopy", Medical Physics 25 (5), 629-637.

J.G. Fletcher, et al., "Optimization of CT colonography technique: prospective trial in 180 patients," *Radiology*, vol. 216(3), pp. 704-711, 2000.

J. Yee, et al., "The usefulness of glucagon hydrochloride for colonic distention in CT colonography," *Am J Roentgenol*, vol. 173(1), pp. 169-172, 1999.

Iordanescu et al., "Benefits of Centerline Analysis for CT Colonography Computer-Aided Polyp Detection", Medical Imaging , Proceedings of SPIE vol. 5031 (2003), pp. 388-397.

Wingo P.J., Cancer Statistics, ca Cancer Journal Clin, 1995; 45:8-30.

\* cited by examiner

THREE-DIMENSIONAL PATTERN RECOGNITION METHOD TO DETECT SHAPES IN MEDICAL IMAGES

CROSS-REFERENCE TO RELATED APPLICATIONS

This application is cross-referenced to and claims priority from U.S. Provisional Application 60/415,269 filed Sep. 30, 2002, which is hereby incorporated by reference.

RESEARCH OR DEVELOPMENT

The present invention was supported in part by grant number RO1 CA72023 from the National Institutes of Health (NIH/NCI). The U.S. Government has certain rights in the invention.

FIELD OF THE INVENTION

The present invention relates generally to medical imaging. More particularly, the present invention relates to methods for differentiating normal and abnormal anatomical shapes through a feature estimation method and a classifier.

BACKGROUND

Colon cancer is the second leading cause of cancer deaths in the United States. American adults have 1/20 chance of developing and 1/40 chance of dying from this disease. There are approximately 150,000 new cases diagnosed each year resulting in 56,000 deaths (See e.g. P J Wingo (1995) in a paper entitled "*Cancer Statistics*" and published in *Ca Cancer Journal Clin.* 45:8-30). Previous research has shown that adenomatous polyps, particularly those larger than 1 cm in diameter, are the most likely precursor to subsequent colorectal carcinoma (See e.g. a paper by R F Thoeni et al. (1994) entitled "*Polyps and cancer*" and published in "*Textbook of Gastrointestinal Radiology*, Philadelphia. W. B. Saunders, p1160). The National Polyp Study clearly illustrated that colonoscopic removal of all identifiable polyps resulted in a decline in mortality rate between 76% and 90% compared to historical controls (See e.g. a paper by S J Winawer et. al. (1993) entitled "*Prevention of colorectal cancer by colonoscopic polypectomy*" and published in *N. Engl. J. Med.* 329:1977-1981). Unfortunately, colon cancer is most often discovered after the patient develops symptoms, and by then, the likelihood of a cure has diminished substantially.

Fiberoptic colonoscopy (FOC) is considered the definitive diagnostic test (See e.g. a paper by D M Eddy (1990) entitled "*Screening for colorectal cancer*" and published in *Ann. Intern. Med.*, 113 373-384) for the presence of colonic polyps as it affords direct visualization and the opportunity for biopsy or removal of suspicious lesions (See e.g. the referenced paper supra by Winawer et. al.). However, FOC is not feasible as a population screening test due to cost, the small but real risk of complications such as perforation, and due to the fact that there are not sufficient endoscopists in the country to accommodate all patients. Moreover, the majority of colonoscopic examinations performed in the United States are negative for polyps or masses, therefore, a less invasive, more widely available procedure that is also acceptable to patients is attractive.

Computed tomography colonography (CTC) (also referred to as virtual colonoscopy) is a recently proposed non-invasive technique that combines spiral CT data acquisition of the air-filled and cleansed colon with 3D imaging software to create virtual endoscopic images of the colonic surface. The initial clinical results are quite promising, yet the technique is still impractical due, in part, to the time required to review hundreds of images per patient study. This limitation begs for a computer-aided detection (CAD) method to help the radiologist detect polyps efficiently from the acquired CTC data.

Identifying colonic polyps using CAD is challenging because they come in various sizes and shapes, and because thickened folds and retained stool may mimic their shape and density. FIG. 1 demonstrates the appearance of polyps and healthy tissue as they appear in a virtual colonoscopy study.

Initial studies describing CAD for polyp detection have focused on shape analysis and started from the intuitive observation on the similarity of the polyp shape to hemispheres. Summers et al. characterized the colon wall by computing its minimum, maximum, mean and Gaussian curvatures (See a paper by R M Summers et al. (2000) entitled "*Polypoid lesions of airways: early experience with computer-assisted detection by using virtual bronchoscopy and surface curvature*" and published in *Radiology* 208(2): 331-337). Following discrimination of polypoid shapes by their principal minimum and maximum curvatures, more restrictive criteria such as sphericity measures are applied in order to eliminate non-spherical shapes. In Yoshida et al. (H. Yoshida et al. (2000) in a paper entitled "*Detection of colonic polyps in CT colonography based on geometric features*" and published in *Radiology* 217(SS):582-582) use topological shape of vicinity of each voxel, in addition with a measure for the shape curvedness to distinguish polyps from healthy tissue. Gokturk and Tomasi designed a method based on the observation that the bounding surfaces of polyps are usually not exact spheres, but are often complex surfaces composed of small, approximately spherical patches (See S B Gokturk & C Tomasi (2000) in a paper entitled "*A graph method for the conservative detection of polyps in the colon*" and published at the *2nd International Symposium on Virtual Colonoscopy* November 2000 Boston, USA). In this method, a sphere is fit locally to the isodensity surface passing through every CT voxel in the wall region. Groups of voxels that originate densely populated nearby sphere centers are considered as polyp candidates. Obviously, the clusters of the sphere centers are denser when the underlying shape is a sphere or a hemisphere.

Paik et al. introduced a method based on the concept that normals to the colon surface will intersect with neighboring normals depending on the local curvature features of the colon (D S Paik et al. (2000) in a paper entitled "*Computer aided detection of polyps in CT colonography: Free response roc evaluation of performance*" and published in *Radiology* 217(SS)370 and D S Paik et al. (1999) in a paper entitled "*Detection of polyps in CT colonography. A comparison of a computer aided detection algorithm to 3-D visualization methods*" and published in *Radiological Society of North America 85th Scientific Sessions*. Chicago, Ill.: *Radiological Soc. N. Amer.* p. 428). This method is based the observation that polyps have 3-D shape features that change rapidly in many directions, so that normals to the surface tend to intersect in a concentrated area. By contrast, haustral folds change their shape rapidly when sampled transversely, resulting in convergence of normals, but change shape very slowly when sampled longitudinally. As a result, the method detects the polyps by giving the shapes a score based on the number of intersecting normal vectors. This score is higher in hemispherical polyps compared with folds.

While most of the current methods have demonstrated promising sensitivity (i.e. ability to detect positives), they can be considered more as polyp-candidate detectors than polyp detectors because of their large number of false positive detections. Some of the methods incorporate simple intuitions about the shapes of polyps and non-polyps, which leads to false positive detections. For instance it has been observed that polyps have spherical shapes and provided different measures of sphericity. However, polyps span a large variety of shapes, and fitting spheres alone is not an accurate measure. As mentioned supra, polyp recognition is a difficult problem, but so is the manual identification of discriminating criteria between polyps and healthy tissue. Therefore, if an automatic method merely results in identifying polyp candidates, then manual examination of a (potentially large) number of images corresponding to the CAD outputs is required to ensure proper polyp detection. Such an examination is costly, time consuming and inefficient. Accordingly, there is need for new detection methods to recognize polyps in medical images and differentiate these polyps from healthy tissue.

SUMMARY OF THE INVENTION

The present invention is a method for detecting and classifying a shape in a medical image. It is based on generating a plurality of 2-D sections through a 3-D volume in the medical image. In general, the present invention is a combination of two steps. The first step is feature estimation to generate shape signatures for candidate volumes containing candidate shapes. The feature estimation method computes descriptors of objects or of their images. The second general step involves classification of these shape signatures for diagnosis. A classifier contains, builds and/or trains a database of descriptors for previously seen shapes, and then maps descriptors of novel images to categories corresponding to previously seen shapes or classes of shapes.

The 2-D sections differ from each other in position, orientation or position and orientation. The main idea here is to develop statistics of information on these sections that represent many variations of the shape. In contrast to previous methods, the method of the present invention does not explicitly make any assumptions about the shape. By choosing reasonable attributes, it captures many characteristics of shapes accurately. Consequently, the approach is applicable to other 3D pattern recognition problem and also to the discovery of any new shapes. The generality is assured by including the new shape samples to the training set of the algorithm, and designing new planar attributes if necessary.

In one exemplary embodiment, the plurality of 2-D sections are a plurality of triples of mutually orthogonal planes, which could also be randomly selected. Feature estimation could be accomplished through the step of determining intensity features or statistics. In one example, feature estimation includes the steps of fitting lines, one or more circles, one or more ellipses, one or more quadratic curves, one or more rectangles, or one or more parallel lines. In one aspect, shape signatures could be obtained via a histogram of a plurality of shape signatures. Shape signatures could also be obtained via vector quantization. The classifier could be a support vector machines classifier, which could be optimized with training data.

The present invention could be utilized as a post-processing method that would refine the results of a high sensitivity, low specificity shape detection method, resulting in an increasing specificity without sacrificing sensitivity. In this case, candidate shapes or volumes containing a candidate shape would be the input to the present method. The present method is, however, not limited to its application as a post-processing method since it could also be used as an independent method without pre-processing identification.

The advantage of the present invention is that it does not make any assumptions about the to-be-detected shape as is common in prior art methods. Another advantage is that if a pre-processing method is used, and method of present invention is used as a post-processing method, then the present method does not have to make assumptions of the pre-processing method. Yet another advantage is that it eliminates the guesswork for obtaining the distinguishing features.

BRIEF DESCRIPTION OF THE FIGURES

The objectives and advantages of the present invention will be understood by reading the following detailed description in conjunction with the drawings, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
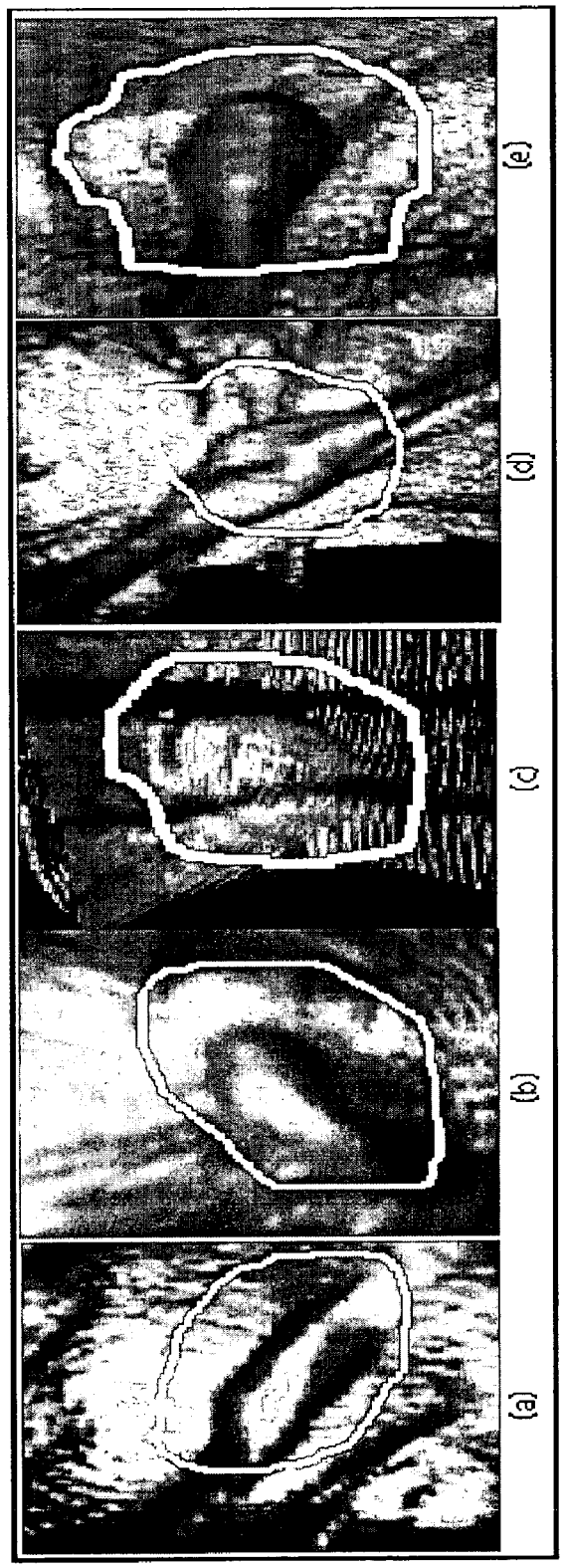
FIG. 1 shows examples of polyps (a-c) and of healthy tissue (d-e) that have similar shapes.
Figure 2:
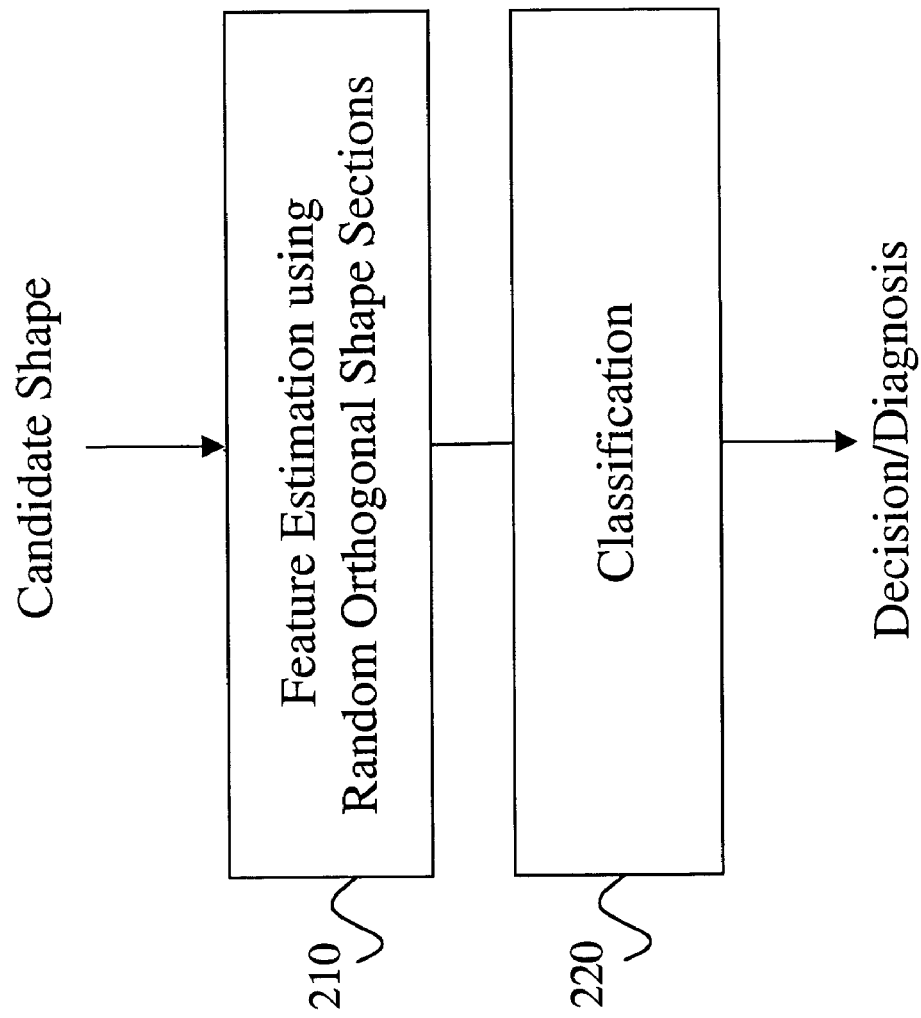
FIGS. 2-3 show a general overview of the method according to the present invention.
Figure 3:
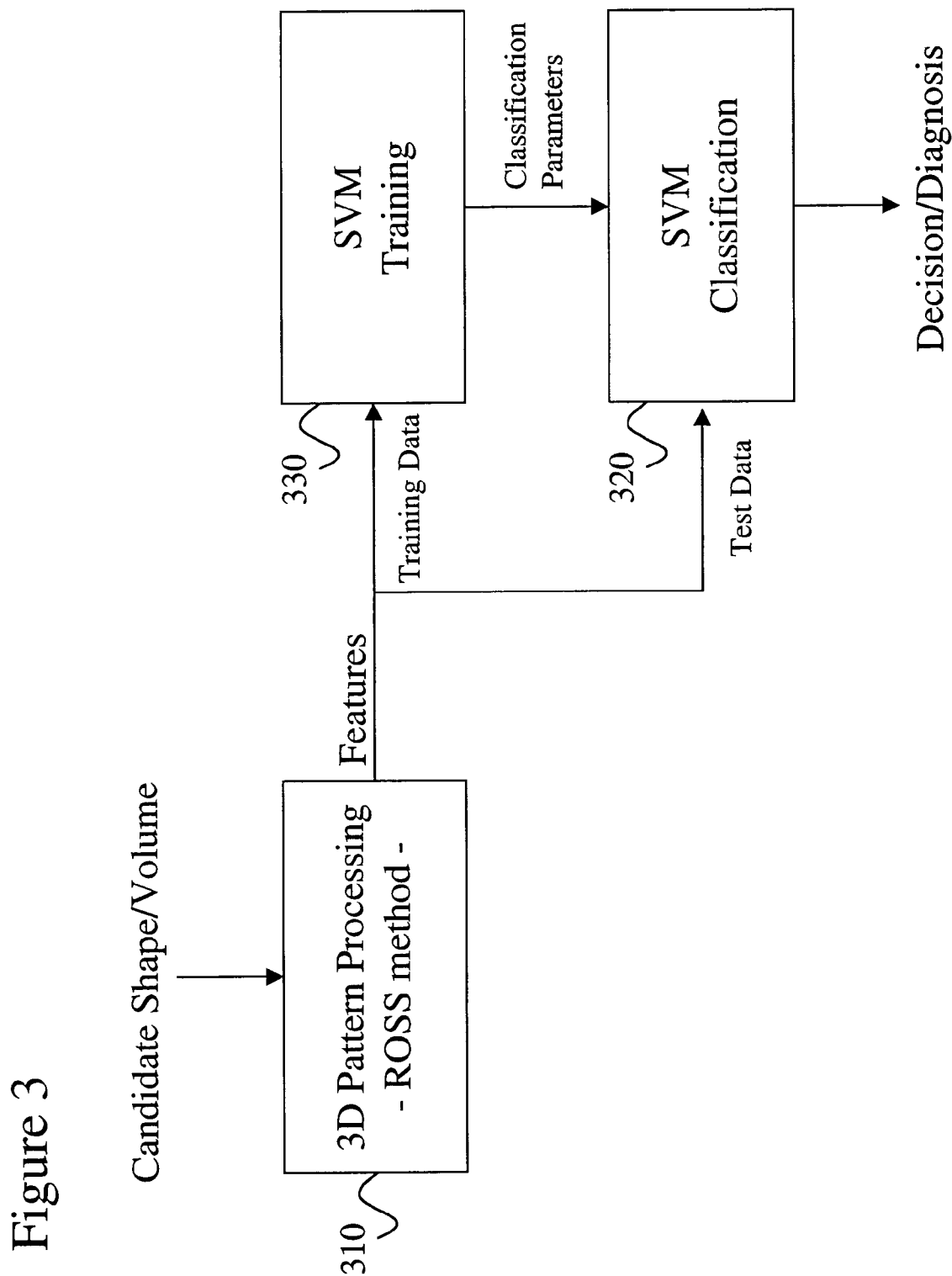

In general, the present invention is a combination of two method steps as shown in FIGS. 2-3. The first step is feature estimation 210 to generate shape signatures for candidate volumes containing candidate shapes. The feature estimation method computes descriptors of objects or of their images. In one example, the feature estimation is based on a Random Orthogonal Shape Sections method (ROSS) 310. The second general step involves classification 220, 320 of these shape signatures for diagnosis. A classifier contains, builds and/or trains a database of descriptors (330) for previously seen shapes, and then maps descriptors of novel images to categories corresponding to previously seen shapes or classes of shapes. In one example the classifier is a support vector machines classifier.

The present method could be utilized as a post-processing method that would refine the results of a high sensitivity, low specificity candidate shape detection method, resulting in an increasing specificity without sacrificing sensitivity. In this case, candidate shapes or volumes containing a candidate shape would be the input to the present method. The present method is, however, not limited to its application as a post-processing method since it could also be used as an independent method without pre-processing identification.

The images are typically digital or computerized images such as, for instance, but not limited to, a CT, an MRI, a digitized X-ray, or any other image application that could be converted or rendered to a digital image. The images could be 2-D images useful to construct a 3-D image or a 3-D volumetric image. A shape that is targeted to be identified or diagnosed is, for instance, but not limited to, a shape that contains pre-cancerous tissue or cancerous tissue. These shapes are of interest to radiologists and are for instance polyps (e.g. colonic polyps), nodules, (e.g. liver and lung nodules), lesions, or the like. In case of colonic polyp, these shapes are differentiated from e.g. non-polyp shapes, tissue or volumes included in the normal colon, thickened haustral folds, and foci of retained stool. Even though the description focuses on CT images of the colon to diagnose colonic polyps, the present method could easily be applied in any type of application where it is necessary to characterize a shape and diagnose whether this shape corresponds to a structure of interest. The following describes in more detail the two general method steps.

1. Random Orthogonal Shape Sections Method (ROSS)

Figure 4:
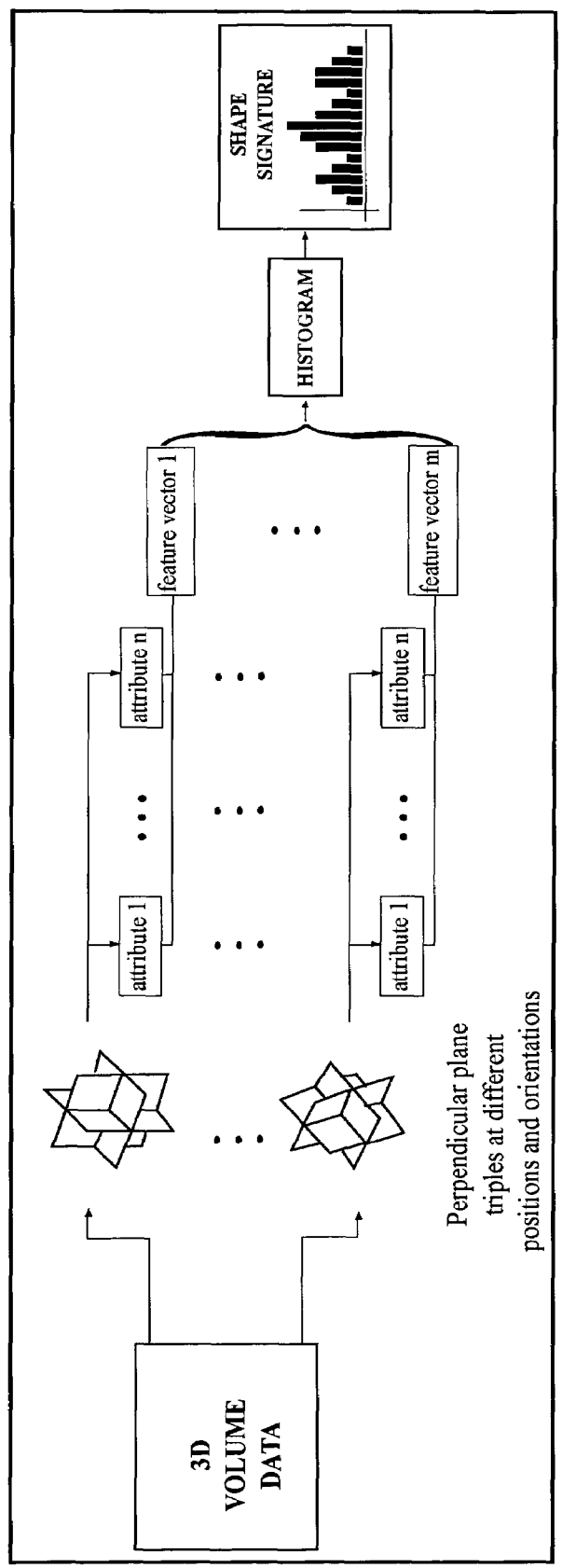
FIG. 4 shows an overview of the ROSS method according to the present invention.
Figure 5:
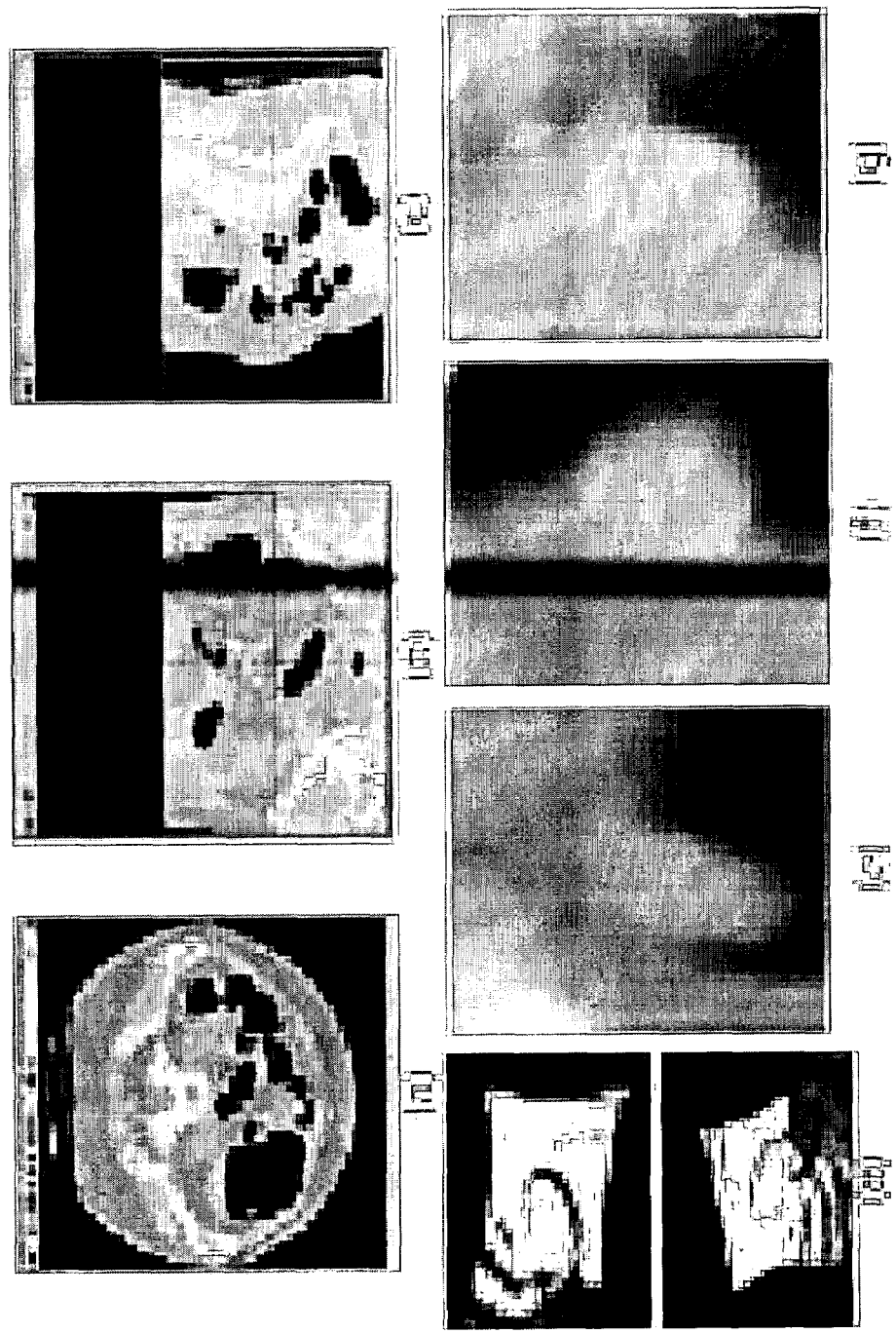
FIG. 5 shows an example of three cross sections of a body through the anatomical directions (a) axial, (b) coronal, (c) sagittal, shows an example of two 3-D renderings of a polyp with different camera views (d), and shows random oriented, mutually orthogonal triple planes through this polyp (e-g), all according to the present invention.

FIG. 4 gives an overview of the ROSS method. Here, the object is to mimic the ways radiologists view CT images of the colon, i.e., by for instance viewing images parallel to the axial, sagittal, and coronal planes (FIG. 5). While viewing these three planes gives substantial information about the 3D shape, the information is incomplete. Therefore, and generally, in the approach of the present invention, we first obtain a large number of different 2-D sections (also referred to as planes) through a volume that includes the shape of interest. These 2-D sections could differ from each other in their orientation and/or position with the intent to cover as many different directions and/or positions through the volume and therewith the shape. In one embodiment, these 2-D sections are randomly selected. In a specific embodiment, these 2-D sections are a large number of random triples of mutually orthogonal sections through a suspicious subvolume. In one example, about a hundred random triples of mutually perpendicular images could be extracted from a candidate subvolume. Although this number could vary, one would realize that even though a reduction of triples would reduce the time required for processing, however this would be a trade-off with accuracy. If a less than adequate number of views is used, the triples could be biased toward some specific orientation in space. To identify an adequate number for a particular application, an easy attempt is to test the reproducibility of the ROSS method. That is the shapes should have the same signatures regardless of the random views used in the analysis. In a reproducibility test, one could also consider testing synthetic shapes such as cylinders, ellipsoids and spheres.

The main idea is that the statistics of information collected over a sufficiently large number of 2-D sections or triples gives a diagnostic and invariant signature of the shape. Because other structures may co-occupy the resulting images, the next step is to segment them to isolate the putative polyp for further processing. We then calculate a set of geometric attributes from each random plane, and generate a histogram of these geometric attributes obtained from each triple as a feature-vector to represent the shape. Accumulating histograms of these attributes over several random triples makes the resulting signatures invariant to rotations and translations. Careful choice of geometric attributes results in robust signatures. Details of the image segmentation and image-based geometric attributes are given in section 1.1 and section 1.2 respectively. This histogram is described in section 1.3.

1.1. Image Segmentation

In each image we first construct a square critical window located in the center of the image, surrounding the suspicious structure and excluding as much of the extraneous tissue as possible. The size of the critical window varies depending on the size and the shape of the suspicious structure in the image. A window is considered good when it contains a shape that is approximately circular and has a small circular radius. Because elongated folds are common in the colon, it was found to be useful to also explicitly rule out elongated regions when there is a circular region in the image. To find a critical window's size, an image is first binarized by intensity thresholding, and the following target function (Equation 1) is computed for each window of size w centered in the middle of the image:

$$f(w) = a_1 r(w) + e_{circle}(w) - a_2 e_{line}(w) \qquad (1)$$

Figure 6:
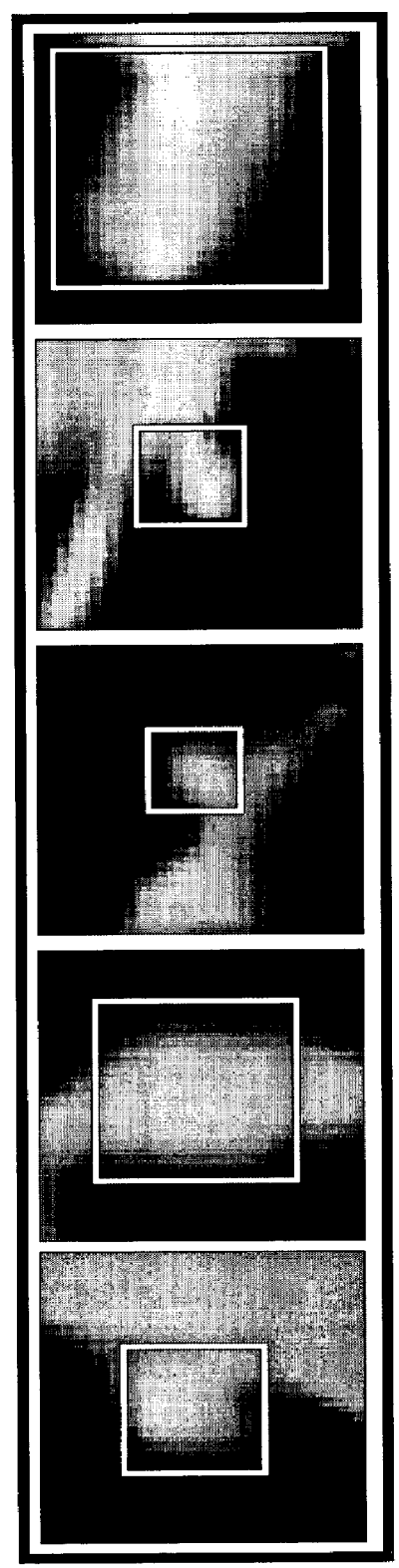
FIG. 6 shows an example of optimum segmentation window in various images according to the present invention.

Here, r(w) is the radius of the circle that best fits the edges in the binarized image, $e_{circle}(w)$ is the residual to the best fitting circle, $e_{line}(w)$ is the residue to the best fitting line all in the subwindow w, and $\alpha_1$ and $\alpha_2$ are constants. Details of the shape fitting are described in the next section. w could be varied from, for instance, 8 mm to 24 mm and the value of w that yields the smallest f(w) is chosen as the critical window size to calculate the geometric attributes. FIG. 6 shows an example of the resulting critical window for several different images with different suspicious lesions. In some cases, minimizing Equation 1 may result in a critical window that includes some portion of the surrounding colon wall. To further accommodate these cases, a Gaussian weighting function, location at the image center, could be used while fitting primitive shapes. By weighting with this Gaussian mask, we aim to give more importance to boundary points of a potential polypoid shape than to those of the surrounding colon wall.

1.2. Image-Based Geometric Attributes and Features

Once the optimal critical subwindow in a particular image/section is found, we can extract shape and intensity related geometric attributes (features) in the critical window.

For this purpose, we can fit primitive shapes such as one or more lines, one or more circles, one or more quadratic curves, one or more rectangles, and one or more parallel sets of lines to the largest connected edge component, i.e., boundary, of the shape. Each primitive shape could be fit in a least squares manner. The boundary in each random plane could for instance be determined by a 2D Sobel derivative operation (See R C Gonzales et al. (1993) in a book entitled *"Digital Image Processing"* and published by Addison-Wesley) followed by thresholding. The mathematical details of the primitive shape fittings are described in section 3.

Figure 7:
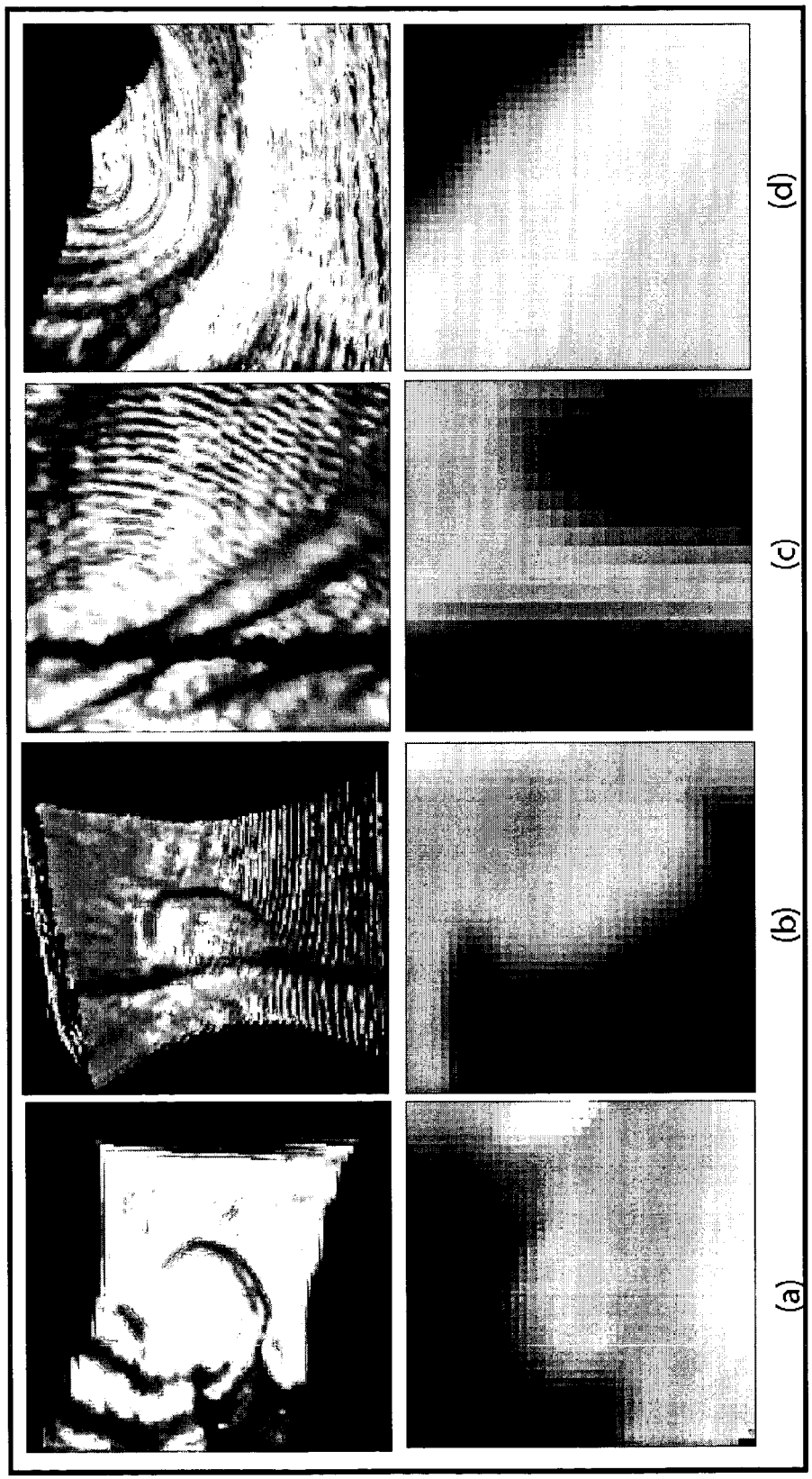
FIG. 7 shows an example of volume renderings of different shapes (top row) and a random cross section through these shapes (bottom row) according to the present invention. These images are specific examples where fitting a circle (a), an ellipse (b), parallel lines (c), and a line (d) produces output about the 3-D shape.

A random slice of a sphere is a circle. Thus, fitting circles is a means of measuring the sphericity of the 3-D shape (FIG. 7(a)). When doing so, the residuals at each pixel on the boundary are first weighted with a Gaussian located at the image center as mentioned in the section supra. The Gaussian weighted residuals are then added together, and the least-square solution gives the optimum circle. The residual to the least-square solution is recorded as well.

Similarly, the ellipsoidal nature of the shape can be measured by fitting a quadratic to the edges. This way, we can capture the similarity of the shape to a pedunculated polyp (FIG. 7(b)). The quadratic invariants given in section 3, as well as the residual to the least-square solution are recorded. The cross section of a fold on the image plane may contain approximately parallel lines (FIG. 7(c)). To capture this structure, we apply parallel lines analysis, which includes fitting lines to the two largest connected components of the boundary points. We record the residual to these lines and the distance and angle between these approximately parallel lines. Similarly, the residual to the optimum fitting line gives information on the flat-ness of the surface (FIG. 7(d)).

Figure 8:
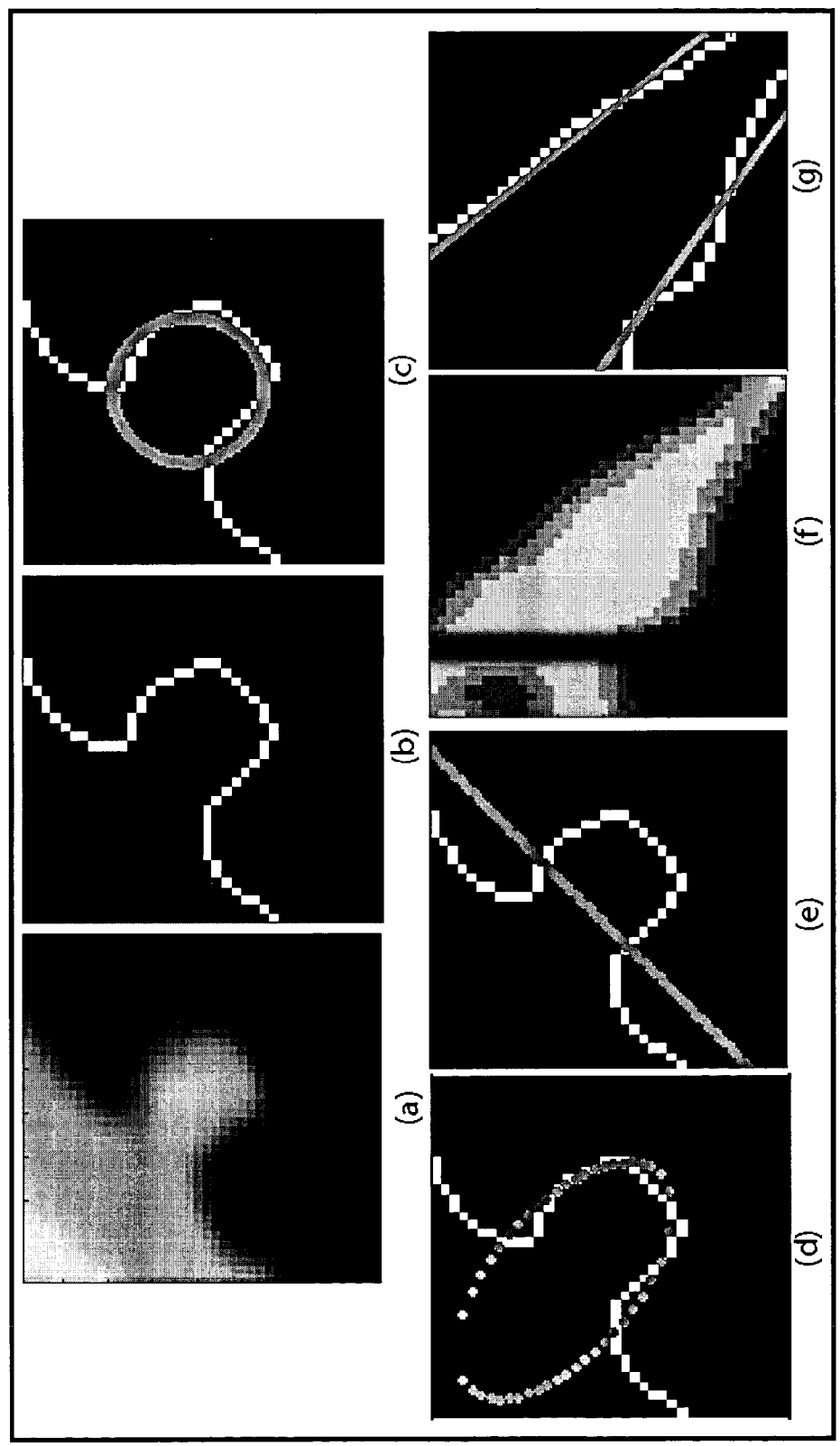
FIG. 8 shows examples according to the present invention of the primitive shapes: (a) a randomly oriented plane, (b) the edges in the image, (c)-(e) circle, quadratic, and line fit to the edges shown in (b). (f) Another randomly oriented plane with nearly parallel lines (g) parallel lines fit to the edges of the plane in (f)

FIG. 8(a) and (b) give an example of a randomly oriented plane and the edges on this plane, respectively FIG. 8(c), (d) and (e) illustrate three primitive shapes, circle, quadratic and line being fit to this random plane. FIG. 8(f) shows another random plane going through a thick fold and FIG. 8(g) shows two approximately parallel lines being fit to its edges.

To extract information on higher order frequency characteristics of the boundary, 3rd order moment invariants are computed as well (See a paper by M K Hu (1962) entitled *"Visual pattern recognition by moment invariants"* and published in *IRE transactions on information theory IT*-8: 179-187). This gives information on the curviness of the boundary points.

In addition to all of these shape-based features, intensity features are extracted from the tissue part of the image. For this, the tissue part is first separated away from the background by intensity thresholding and, next, the intensity mean and standard deviation of the tissue are calculated and recorded. The intensity-based features are not discriminative features in polyp recognition, therefore, these features could be omitted when used in polyp recognition applications. These features, however, can be useful in another medical shape recognition problem.

All the attributes mentioned so far are calculated for each random triple of images. The three images in each triple are sorted in the order of increasing radius of curvature, and the features above are listed into a vector in this order. The resulting N-vector containing the N attributes from the three planes represents the signature of the shape, relative to that particular triple of perpendicular planes.

2.3. Obtaining the Histograms in High-Dimensional Space

Figure 9:
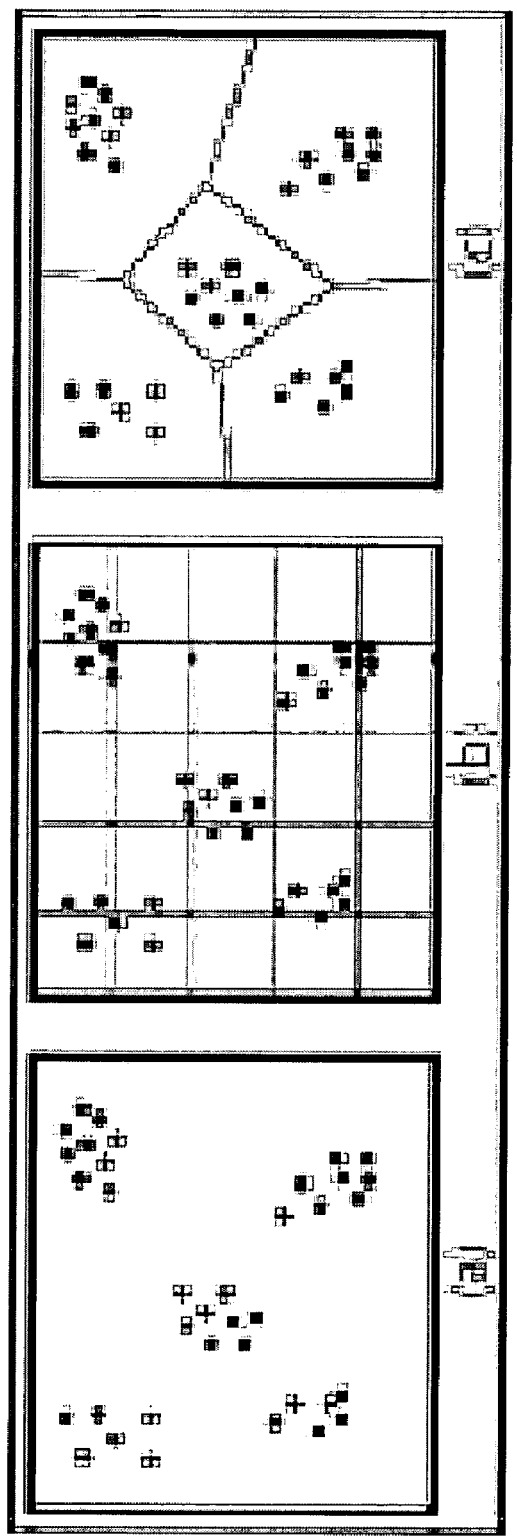
FIG. 9 shows an example of high dimensional histogram bins in 2-D according to the present invention: (a) Data in two dimensions; (b) Uniform histogram bins; (c) Bins found when clustering is applied. The storage gain (number of bins) is fivefold in this particular example.

The following step in the method of the present invention is to obtain histograms of feature vector distributions over the randomly oriented 2-D sections or triples. Given enough 2-D sections or triples, these histograms are essentially invariant to orientation and position. An efficient solution, proposed here, represents a histogram by first computing the representatives for the main clusters of features over a large collection of vectors. New feature vectors are then assigned to these clusters, rather than to fixed uniform bins. This method is called vector quantization (For a reference see a book by A Gersho & R M Gray (1992) entitled *"Vector Quantization and Signal Compression"* and published by Kluwer Academic Press). FIG. 9 shows an example in 2-D space. Note that, storage efficiency increases exponentially as the number of dimensions increase beyond two.

In the implementation of the method of the present invention one could suppose that $X_{ij}$ is the N-vector obtained from the $j^{th}$ random triple of perpendicular planes extracted from the $i^{th}$ shape in a training set. One could then obtain $X_{ij}$'s from all of the shapes, and then invoke the k-means algorithm (for a reference see A Gersho & R M Gray (1992) in a book entitled *"Vector Quantization and Signal Compression"* and published by Kluwer Academic Press) to compute vector clusters. The cluster centers are first initialized to a random selection from $X_{ij}$'s. Subsequent iterations of the k-means algorithm then alternately reassign vectors to clusters and re-compute cluster centers, resulting eventually in the optimum cluster centers.

Figure 10:
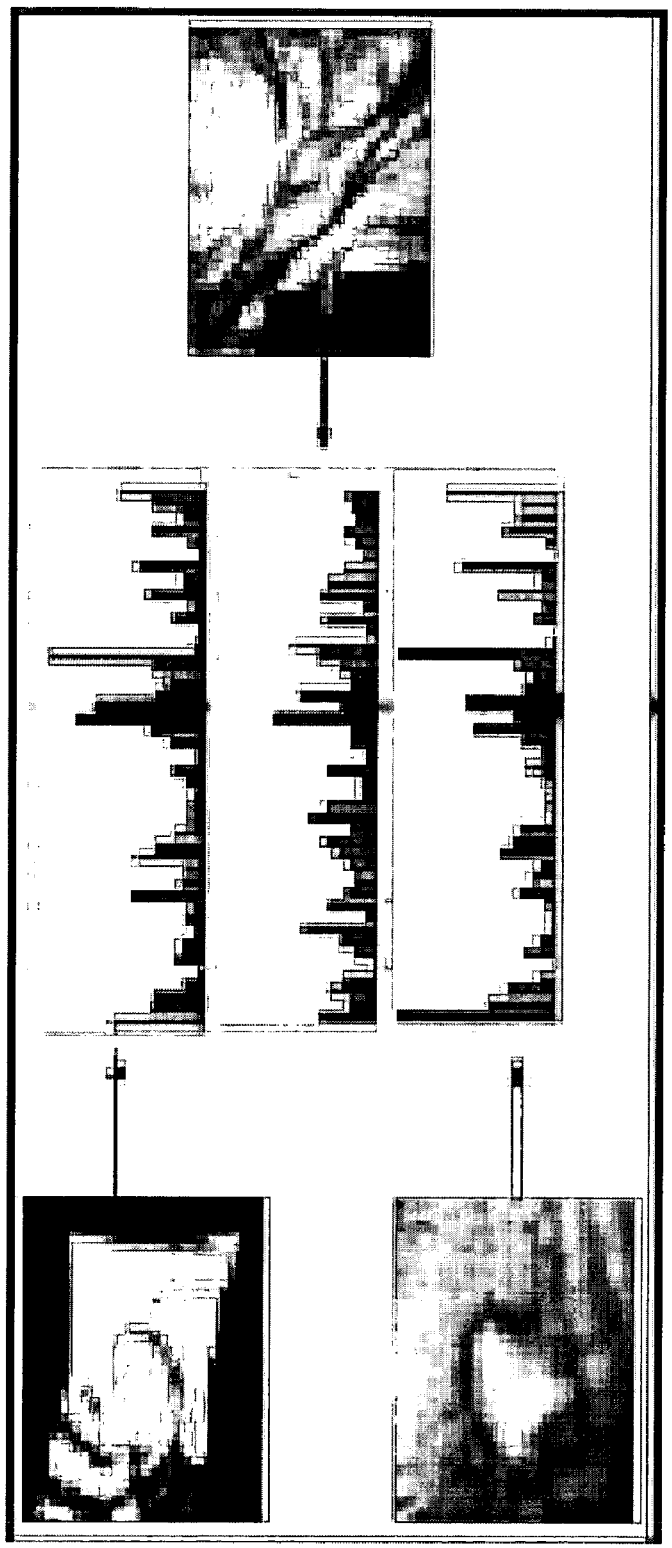
FIG. 10 shows an example of two polyps (left), a very similarly shaped fold structure (right), and their signatures (center) according to the present invention.

Once the representative histogram bin centers are determined, a histogram of feature vectors belonging to each particular shape is calculated. When forming these feature histograms, the simplest strategy would be to have each vector increment a counter for the nearest cluster center. This method, however, is overly sensitive to the particular choice of clusters. In the present method a more robust solution is adopted in which each feature vector partitions a unit vote into fractions that are inversely proportional to the vector's distances to all histogram bin centers. The histograms thus obtained, one per candidate volume, are the rotation and translation invariant shape signatures used for classification as described in the next section. FIG. 10 shows examples of signatures obtained from three different shapes.

2. Classifier

Given the representative vectors for polyps and healthy tissue, the optimum classifier is computed using training data. Subsequently the optimum classifier is used on test data. In the particular example of CTC, a training set is defined as a collection of candidate volumes that are classified by fiberoptic colonoscopy (FOC) and CT colonoscopy to be polyps or non-polyps.

In general, a support vector machines (SVM) classifier aims to find the optimal differentiating hypersurface between the two classes in the training set (See e.g. V Vapnik (1998) in a book entitled *"Statistical Learning Theory,* New York). The optimal hypersurface is the one that not only correctly classifies the data, but also maximizes the margin of the closest data points to the hypersurface.

Mathematically, we consider the problem of separating the training set S of points $x_i \in R^n$ with i=1, 2, . . . , N. Each data point $x_i$ belongs to either class and, thus, is given a label $y_i \in \{-1,1\}$. SVM implicitly transforms the given feature vector $x_i$ into new vectors $\phi(x)$ in a space with more dimensions, such that the hypersurface that separates the x, becomes a hyperplane in the space of $\phi(x)$s. Thus the linearly non-separable data in the original space becomes linearly separable in a higher dimension. Finding the hypersurface is a well-studied optimization problem that maximizes the distance of the hypersurface to the margin points, so called support vectors (See e.g. V Vapnik (1998) in a book entitled "*Statistical Learning Theory,* New York; B Schölkopf (1997) in a book entitled "*Support Vector Learning*" and published by Munich, Germany; R Oldenbourg Verlag; K Veropoulos et al. (1999) in a paper entitled "*Controlling the sensitivity of support vector machines*" and presented at the Int. Joint Conf. AI (IJCAI'99), Stockholm, Sweden). Support vectors are essentially the elements that carry the differentiating characteristics between polyps and nonpolyps. In the classification of a test vector x, only the support vector needs to be considered, and the following expression needs to be calculated:

$$d(x) = \sum_{x_i \in SVs} \alpha_i y_i K(x_i, x) + b \quad (2)$$

where the constants $\alpha_i$, b are computed by the classifier-learning algorithm, and the $x_i$ are the computed support vectors (SVs). K is called the Kernel function, and is used to map the data from its original dimension to higher dimensions so that the data is linearly separable in the mapped dimension (For reference see B Schölkopf (1997) in a book entitled "*Support Vector Learning*" and published by Munich, Germany; R Oldenbourg Verlag). Given the expression d(x), the decision is given based on the sign of d(x):

$$\text{decision} = \begin{cases} \text{polyp} & \text{if } d(x) \geq 0 \\ \text{non-polyp} & \text{if } d(x) < 0 \end{cases} \quad (3)$$

In other words, in the classification process of a test case, it is checked which side of the hypersurface the element resides. If it is in the polyp side, it is decided that the new case is a polyp, and otherwise, it is a non-polyp. It could also be given a score to each element by looking at its distance from the optimal hypersurface.

In clear contrast with previous classification methods, such as linear discriminant analysis (LDA), or nearest neighbor methods that minimize the empirical risk (risk of misclassification in the training set), SVMs minimize the structural risk, given as the probability of misclassifying previously unseen data, by utilizing the optimal hyperplane between two classes of data. In addition, SVMs pack all the relevant information in the training set into a small number of support vectors and use only these vectors to classify new data. This way, the distinguishing features of the two classes are implicitly identified while the detracting less important points are discarded. In other classification methods such as LDA or neural networks, the classification surfaces are obtained by taking all of the data points into account, which might statistically deteriorate the performance of these methods.

3. Primitive Shape Fitting

Let be a collection of points in the image boundary with image coordinates $(x_i, y_i)$ with i=1, . . . N. In this section, examples of mathematical details are described to fit primitive shapes such as circle, quadric curve, and line to the collection of points $P_i$.

A circle is defined by its three parameters: The coordinates of its center $(x_0, y_0)$ and its radius r. The points $P_i$ satisfy the circle equation $$[2x_i, 2y_i, 1]\begin{bmatrix} x_0 \\ y_0 \\ r^2 - x_0^2 - y_0^2 \end{bmatrix} = [x_i^2 + y_i^2] \quad (4)$$

In order to find the three unknowns $(x_0, y_0, r)$, equations coming from each point are stacked and a linear least-square solution is obtained. Let A and b be the following matrix and vector:

$$A = \begin{bmatrix} 2x_1 & 2y_1 & 1 \\ 2x_2 & 2y_2 & 1 \\ & \vdots & \\ 2x_N & 2y_N & 1 \end{bmatrix} \quad B = \begin{bmatrix} x_1^2 + y_1^2 \\ x_2^2 + y_2^2 \\ \vdots \\ x_N^2 + y_N^2 \end{bmatrix} \quad (5)$$

then $[x_0 y_0 r^2 - x_0^2 - y_0^2]^T = (A^T A)^{-1} A^T b$ is the least-square solution to the best fitting circle. Similarly, the residue to the least-square solution is $e_{circle} = A[x_0 y_0 r^2 - x_0^2 - y_0^2]^T - b$.

A quadratic is defined by the following equation:

$$[x_i^2, y_i^2, 2x_i y_i, 2x_i, 2y_i]\begin{bmatrix} \dot{a} \\ \dot{b} \\ \dot{c} \\ \dot{d} \\ \dot{e} \end{bmatrix} = [-1] \quad (6)$$

Similar to the circle equations, the matrix A and the vector b are built by stacking the left and right sides of the equation, thus, the least-square solution is given by $[\dot{a}\dot{b}\dot{c}\dot{d}\dot{e}]^T = (A^T A)^{-1} A^T b$. The least-square residue is given by $e_{quadratic} = A[\dot{a}\dot{b}\dot{c}\dot{d}\dot{e}]^T - b$.

The quadratic equation can also be written in the following form:

$$[x_i, y_i, 1]T\begin{bmatrix} x_i \\ y_i \\ 1 \end{bmatrix} = 0 \quad (7)$$

where T is given by:

$$T = \begin{bmatrix} \dot{a} & \dot{c} & \dot{d} \\ \dot{c} & \dot{b} & \dot{e} \\ \dot{d} & \dot{e} & 1 \end{bmatrix} \quad (8)$$

The singular values of the matrix are invariant to rotations of the quadratic shape and, thus, are recorded as quadric invariants.

The equation of a line is defined by a point on the line and its direction. Given a collection of points $(x_i, y_i)$ for i=1, . . . , N, the best fitting line (in the least-square sense) goes through the central point $(x_0, y_0)$. The line itself can then be written as:

$$\begin{bmatrix} x_i \\ y_i \end{bmatrix} = \begin{bmatrix} x_0 \\ y_0 \end{bmatrix} + k_i \begin{bmatrix} v_i \\ vy \end{bmatrix} \quad (9)$$

where $v=[v_x + v_y]^T$ is the direction of the line. Let $(\tilde{x}_i, \tilde{y}_i)$ be the normalized point coordinates of $P_i$.

$$\begin{bmatrix} \tilde{x}_i \\ \tilde{y}_i \end{bmatrix} = \begin{bmatrix} x_i \\ y_i \end{bmatrix} - \begin{bmatrix} x_0 \\ y_0 \end{bmatrix} \quad (10)$$

v is then given as the first singular vector of M, where M is the following matrix:

$$M = \begin{bmatrix} \tilde{x}_1 \tilde{x}_2 & \cdots & \tilde{x}_N \\ \tilde{y}_1 \tilde{y}_2 & \cdots & \tilde{y}_N \end{bmatrix} \quad (11)$$

Given v and $(x_0, y_0)$ the best fitting line equation is complete. For any given point $P_i$, the error to this line is given as:

$$e_{line}^i = \left\| v^T \begin{bmatrix} \tilde{x}_i \\ \tilde{y}_i \end{bmatrix} v - \begin{bmatrix} \tilde{x}_i \\ \tilde{y}_i \end{bmatrix} \right\| \quad (12)$$

4. Conclusion

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, in one aspect the choice of kernel function in the support vector machines classification is a parameter that could directly affect the results. One could choose kernel function such as, but not limited to, radial basis functions, exponential radial basis functions, polynomial functions, linear kernel, and histogram-based kernels. In another aspect to expand the differentiation of different 3-D shapes one could use different geometrical properties that are determined from each triple of planes or a combination of 2-D sections. In yet another aspect, related to the training process, the resulting support vectors could give valuable feedback for designing new features for the classifying system. More specifically, the clusters of close by support vectors from the two classes belong to similar shapes in polyps and nonpolyps. These closeby support vectors will help observe the distinguishing features of similar polyps and nonpolyps. In still another variation, the classifier could also be a hidden markov model based classifier, a neural network based classifier, a fuzzy-based classifier, a genetic algorithm based classifier, or any other classifier capable of classifying the shape signature information.

Note that while the present invention has been described in the context of a method, those skilled in the art will appreciate that the method of the present invention is capable of being distributed in the form of a computer readable medium of instructions in a variety of forms, and that the present invention applies equally regardless of the particular type of signal bearing medium used to actually carry out the distribution. In other words, the present invention is also a program storage device accessible by a computer, tangible embodying a program of instructions or means executable by the computer to perform method steps for detection and classification of a shape in a medical image as described supra. Examples of computer readable media include recordable type media such as disks and CD-ROMS and transmission type media such as digital and analog communication links. In addition, the present invention could be implemented and coded in different programming languages and/or packages. All such variations and other variations are considered to be within the scope and spirit of the present invention as defined by the following claims and their legal equivalents.

What is claimed is:

1. A method for detecting and classifying a shape in a medical image, comprising the steps of:
    (a) having a shape signature classifier, said shape signature classifier comprises a plurality of shape signatures of different shapes;
    (b) determining a shape signature, wherein said determining comprises:
        (i) having a 3-D volume of a medical image said 3-D volume comprises at least part of a structure;
        (ii) selecting a shape within said at least part of said structure of said 3-D volume;
        (iii) generating a plurality of triples of mutually orthogonal planes within said 3-D volume, wherein said triples differ from each other in position, orientation or position and orientation;
        (iv) for each set of said plurality of triples determining a plurality of attributes;
        (v) for each set of said plurality of triples combining said determined plurality of attributes into a feature vector; and
        (vi) combining said feature vectors into a shape signature defining said selected shape within said 3-D volume, wherein said shape signature is obtained via a vector quantization method; and
    (c) classifying said selected shape by analyzing said shape signature of said combined feature vectors in view of said plurality of shape signatures in said shape signature classifier.

2. The method as set forth in claim 1, wherein said plurality of triples of mutually orthogonal planes are randomly selected.

3. The method as set forth in claim 1, wherein said determining said plurality of attributes comprises the step of determining intensity features or statistics.

4. The method as set forth in claim 1, wherein said determining said plurality of attributes comprises the step of fitting one or more lines, fitting one or more circles, fitting one or more ellipses, fitting one or more quadratic curves, fitting one or more rectangles, or fitting one or more parallel lines.

5. The method as set forth in claim 1, wherein said shape signature classifier is a support vector machines classifier.

6. The method as set forth in claim 1, wherein said shape signature classifier is optimized with training data.

7. The method as set forth in claim 1, wherein said classified shape is used as training data for said classifier.

8. The method as set forth in claim 1, wherein the step of classifying further comprises the step of distinguishing a polyp from a non-polyp.

9. The method as set forth in claim 1, wherein said shape is selected by a pre-detection of said shape.

10. The method as set forth in claim 1, wherein said medical image is obtained through computed tomography colonography, wherein said at least part of said structure is at least part of a colon, wherein said shape is within said at least part of said colon, and wherein said shape is either a polyp or a non-polyp.

11. The method as set forth in claim 1, wherein said step 1(b) is performed in a post-processing step.

12. The method as set forth in claim 1, wherein said method steps are computer-implemented and executable as a computer program.

* * * * *